United States Patent [19]

Bryce-Smith et al.

[11] 3,972,830

[45] Aug. 3, 1976

[54] SILVER CATALYSTS

[76] Inventors: Derek Bryce-Smith, Highland Wood House, Mill Lane, Kidmore End, near Reading, Berkshire; Ernest Thomson Blues, 36 Reed Avenue, Earley, Berkshire, both of England

[22] Filed: Jan. 6, 1975

[21] Appl. No.: 538,706

Related U.S. Application Data

[63] Continuation-in-part of Ser. No. 433,537, Jan. 15, 1974, abandoned.

[30] Foreign Application Priority Data

Jan. 25, 1973  United Kingdom............... 3902/73
Sept. 19, 1973  United Kingdom............. 43995/73

[52] U.S. Cl............................... 252/430; 252/476
[51] Int. Cl.² ........................................... B01J 31/02
[58] Field of Search........................... 252/430, 476

[56] References Cited
UNITED STATES PATENTS 3,647,720  3/1972  Bryce-Smith et al. ............. 252/476
3,781,317  12/1973  Bryce-Smith et al. ............. 252/476

*Primary Examiner*—J. Poer
*Attorney, Agent, or Firm*—Cushman, Darby & Cushman

[57] ABSTRACT

The production of supported catalytically active silver from silver ketenide under conditions which obviate the risk of explosion if effected by depositing silver acetate on a catalyst support, and heating the dried product in the presence of a non-reducing tertiary amine and/or amide whereby silver ketenide is concurrently formed and decomposed to a catalytically active silver-containing material. By extending the heating time a silver catalyst composition may be produced which has a magnetic susceptibility which is field dependent, and which has a high electrical, and hence thermal, conductivity.

4 Claims, No Drawings

SILVER CATALYSTS

This application is a continuation-in-part of our earlier application Ser. No. 433,537 filed Jan. 15, 1974, now abandoned.

This invention relates to the preparation of supported silver catalysts, and particularly relates to the preparation of such catalysts wherein the silver is in highly active form derived from silver ketenide.

Silver ketenide is a compound disclosed and claimed in U.S. Pat. No. 3,781,317 wherein the silver atoms are considered to have a layer structure, each layer of silver atoms being joined by a plurality of ketenide residues of formula $C_2O$.

The decomposition of silver ketenide produces silver metal having an unusually high catalytic activity, and it is considered that the enhanced activity is due at least in part to the retention in the silver metal of silver having a layer atomic structure. It is further considered that such silver, whether in the form of silver ketenide or silver ketenide complexes or of silver metal, is an example of "cluster" silver. Cluster silver may be characterized by a magnetic susceptibility which is field dependent, and silver ketenide by an infra-red spectrum showing an absorption peak between 1900 $cm^{-1}$ and 2100 $cm^{-1}$.

Silver catalysts are used extensively in the oxidation of hydrocarbons, particularly olefinic hydrocarbons, e.g. ethylene and propylene to their respective oxides. In practice the catalytic material comprises silver incorporated on a catalyst support, and may be associated with selective modifiers, e.g. ethylene dichloride, and promoters, e.g., alkali metal halides, alkaline earth metal halides and transition metal halides or carboxylates.

While silver ketenide or a complex thereof has been used as a precursor in the preparation of supported catalysts, there is a disadvantage in that under certain conditions silver ketenide may have explosive properties. While such properties may be mild in effect, they nevertheless impose a hazard in producing such supported catalysts in commercial conditions, and the present invention is directed to a method whereby supported silver-containing catalysts may be derived from silver ketenide under conditions whereby no explosive hazard is produced. A further characteristic of catalyst compositions produced according to the present invention is that they may have a high electric conductivity with concomitant high thermal conductivity, and may thus be used in exothermic reactions whereby undue formation of hot spots is inhibited.

The invention is based on the observation that silver acetate deposited on a catalyst support may be converted into silver ketenide in the presence of an organic non-reducing tertiary base and/or amide, and concurrently decomposed by the action of heat to silver-containing material of high catalytic activity. Thus in the method of the invention it is not necessary to provide an external supply of acetic anhydride to effect the production of silver ketenide, and in fact is undesirable.

The invention provides a method of preparing a supported silver catalyst, which comprises depositing silver acetate on a catalyst support material and heating the composition thus obtained in the presence of a non-reducing tertiary base and/or amide whereby at least a portion of the silver acetate is converted into silver ketenide, and continuing the said heating whereby the silver ketenide is decomposed to a black or grey silver-containing material.

The term "tertiary base" as used herein includes tertiary aliphatic amines and tertiary aromatic amines. By definition, then, pyridines, for instance pyridine and substituted pyridines are included as such compounds are tertiary amines having the characteristics of tertiary bases.

The formation of the silver ketenide is indicated by the initial development of a yellow or yellowish-red color on the catalyst support, and as the heating is continued the decomposition of the silver ketenide is indicated by a progressive darkening of the yellow or yellowish-red color to produce a blackening of the catalyst support. Further heating in the presence of oxygen, e.g., air, converts the blackened support to a grey color. It is considered that the black silver-containing material initially formed is associated with carbonaceous material, which may be removed by further heating in the presence of air to provide the grey silver-containing catalytically active material.

The term "non-reducing" as used herein and in the claims hereof for the tertiary base and amide means that the said base and amide does not effect reduction of the silver acetate to metallic silver under the conditions of heating during the formation of silver ketenide in the process of the invention. Examples of such bases are, amines, e.g., N,N,N',N'-tetra alkyl ethylene diamines, N,N-dialkylamino alkyl ethers, tertiary aliphatic monoamines, e.g. triethylamine, pyridine, substituted pyridines, e.g. methyl-substituted pyridines, quinoline and substituted quinolines, e.g. methyl substituted quinoline, and N-alkyl morpholines. An example of such an amide is N,N-dimethyl acetamide. If desired, two or more such tertiary amines and/or amides may be employed. The term "non-reducing" therefore excludes alkylene diamines or alkylene diamine-containing mixtures.

A preferred procedure of the method of the invention comprises the steps of:
1. impregnating a catalyst support with a solution of silver acetate containing the said non-reducing tertiary amine and/or amide,
2. drying the said impregnated catalyst support whereby silver acetate is retained on the support together with absorbed said amine and/or amide. The said impregnating and drying may be effected by heating the support together with the said solution in a rotary evaporator, e.g. at a temperature of from 80° to 110°C. preferably under a reduced pressure.
3. heating the dried impregnated support containing absorbed amine and/or amide at a temperature of at least 140°C., preferably at a temperature within the range 150° to 300°C. and preferably under a nonoxidizing atmosphere, e.g. nitrogen, argon, or preferably a gaseous hydrocarbon, particularly ethylene, until a yellow or yellowish-red color is generated on the said support, (the said yellow or yellowish-red color denotes the formation of silver ketenide, which may be identified by an infra-red absorption spectra having a peak at about 1960 $cm^{-1}$),
4. continuing the heating until blackening of the support composition is effected, and preferably
5. further heating the product in the presence of an oxygen-containing gas, e.g. air or an air-hydrocarbon mixture preferably at a temperature not exceeding 200°C. until the support composition has a uniform grey appearance.

The uniform grey color of the catalyst support indicates the formation of a catalytically-active silver-containing material thereon. Such grey silver-containing material is found to have a magnetic susceptibility which is field dependent, denoting the formation of Cluster silver.

Deposition of the silver acetate on the said support from a solution containing the said non-reducing tertiary amine and/or amide may be in the form of a solvate of the said amine, e.g. as silver acetate pyridinate when pyridine is present in the said solution. Such a solvate releases the solvating amine during the subsequent heating. With conventional catalyst supports, e.g. α-alumina, silica and silicon carbide, the said non-reducing tertiary amine and/or amide may be adsorbed in the support during the impregnation step and retained therein during the drying step, being subsequently released during the heating steps from the formation and concurrent decomposition of silver ketenide.

If a relatively non-adsorbent catalyst support is used, e.g. quartz, glass or metal support, the silver acetate is deposited on the non-adsorbent support, e.g. from a solution thereof as hereinbefore described, and the dried support is contacted with a supply of the said non-reducing tertiary amine and/or amide during the heating steps leading to the conversion and concurrent decomposition of silver ketenide. Such a technique may be applied also to silver acetate deposited on an adsorbent support.

As hereinbefore described, any conventional catalyst support may be used, including alumina, magnesia, kieselguhr, silicon carbide, montmorillanite clays, zeolites, oxides of transitional metals and ceramics.

The following Examples of the invention are provided:

EXAMPLE 1

100 Grams of 3/16 inch diam. silicon carbide granules (obtained under the Trade Mark NORTON LC 891 Batch No. HY341) as catalyst support material were immersed in a 5% by weight solution of silver acetate (British Drug Houses Limited Batch No. 1397660) in pyridine contained in a round-bottomed flask. The flask and its contents were subjected to a reduced pressure to remove air bubbles from the pores of the support, and the flask and its contents was then attached to a rotary evaporator and most of the pyridine removed by heating the flask over a boiling water bath for 1 hour.

The dried support impregnated with silver acetate was then removed from the flask and transferred to a 25 mm. diameter boro-silicate glass reactor tube, and the tube flushed with ethylene. The tube and its contents was then heated to 150°C. for 10 minutes, ethylene being passed through the tube at a rate of 5 mls/min. During this period the impregnated catalyst support changed to a bright yellow indicating the formation of a ketenide structure, which if desired could be confirmed by an infra-red adsorption measurement.

After the onset of the bright yellow color, heating of the tube and its contents was maintained at 160°C. under a stream of ethylene for 12 hours during which time the bright yellow color of the impregnated support progressively blackened. The temperature of the tube was then increased to 270°C. for a further 3 hours, whereby volatile carbonaceous matter associated with the black product on the catalyst support was removed, and the tube cooled to 120°C. and then heated slowly to 170°C. with a 1:1 vol. ethylene/air mixture passing through the tube, and maintained under these conditions until the treated catalyst composition in the tube achieved a uniformly grey color.

The catalyst composition thus obtained was found to have the electrical conductivity properties of a metallic electrical conductor, having a high electrical conductivity, the resistance across a 3/16 inch granule of the grey product having an electrical resistance of approximately 1 ohm.

The grey silver-containing material on the product thus obtained was found to have a magnetic susceptibility which was field dependent, measurement on a Faraday balance of the removed grey silver-containing material producing the following results:

| Field Strength Kilogauss | Magnetic Susceptibility $\chi g^{22} \phi$ c. $\times 10^6$ E.M.U. |
|---|---|
| 4.0 | + 0.161 |
| 5.5 | + 0.128 |
| 6.7 | + 0.111 |
| 7.6 | + 0.102 |
| 8.3 | + 0.097 |

The grey supported catalyst composition was used for the direct air oxidation of ethylene to ethylene oxide at atmospheric pressure using a $C_2H_4$/air vol. ratio of 1:20, and a space velocity of 600 v/v/hour. The following selectivity and conversions were obtained at various reaction temperatures.

| Reaction Temperature °C. | Selectivity % | Conversion % |
|---|---|---|
| 205 | 82 | 34 |
| 224 | 80 | 74 |
| 232 | 75 | 80 |

While the above oxidation runs were carried out in the absence of ethylene dichloride, the presence of ethylene dichloride as a reaction modifier resulted in an increased selectivity.

It is preferred that the catalyst compositions of the present invention contain trace amounts of catalyst promoters. Such promoting agents may be preferably present in the solution of silver acetate used in the preferred method as hereinbefore described. Examples of conventional promoters include alkali-metal, alkaline earth-metal and/or transitional-metal compounds, particularly sodium, barium, calcium, magnesium and/or iron compounds.

EXAMPLE 2

Silver acetate (British Drug Houses Ltd. purified by recrystallisation from distilled water). (5.0 g) was dissolved in 3-methylpyridine (50 ml. A.R. grade) containing sodium acetate (0.0121 g.) as a promoter. This solution was added to a 250 ml. round-bottomed flask containing 50 g. of catalyst support. (3/16 inch alumina spheres, such as Hydronyl-Norton Inc.). The procedure followed thenceforth in the preparation and curing of the catalyst was similar to Example 1.

The catalyst was used for the direct air oxidation of ethylene to ethylene oxide using a $C_2H_4$/air col. ratio of 1:9, and a space velocity of 400 v/v/hr. The following selectivity and conversions were obtained at various oxidation temperatures.

| Reaction Temperature °C. | Selectivity % | Conversion % |
|---|---|---|
| 193 | 80.0 | 2.3 |
| 210 | 75.0 | 3.6 |
| 230 | 73.3 | 6.8 |
| 252 | 69.2 | 11.8 |

EXAMPLE 3

Silver acetate (L.R. grade such as from British Drug Houses Ltd. recrystallised from distilled water). (5.0 g.) was dissolved in N,N,N',N'- tetramethyl ethylenediamine (50 ml) (Koch-Light Ltd.) containing sodium acetate (0.0121 g) as a promoter. This solution was added to a 250 Ml. round-bottomed flask containing 50 g. of catalyst support (3/16 inch alumina spheres, Hydronyl-Norton Inc.). The procedure followed thenceforth in the preparation and curing of the catalyst was similar to that described in Example 1.

The catalyst was used for the direct air oxidation of ethylene to ethylene oxide using a $C_2H_4$/air ratio of 1/9, and a space velocity of 400 v/v/hr. The following selectivities and conversions were obtained at various oxidation temperatures.

| Reaction Temperature °C. | Selectivity % | Conversion % |
|---|---|---|
| 186 | 75.0 | 2.6 |
| 220 | 72.0 | 4.3 |
| 240 | 70.5 | 9.6 |
| 265 | 66.3 | 17.4 |
| 295 | 64.4 | 34.8 |

EXAMPLE 4

50 grams of 3/16 inch diam. alumina spheres (Hydronyl-Norton Inc.) as catalyst support material were immersed in a suspension of 5 grams of silver acetate in 50 ml. of triethylamine contained in a round-bottomed flask. The flask and its contents were attached to a rotary evaporator and most of the triethylamine removed at reduced pressure by heating the rotating flask at 100° for 1 hour. The coated support was removed from the flask and converted to an active catalyst by the procedure described in Example 1.

The supported catalyst was used for the direct air oxidation of ethylene to ethylene oxide using a $C_2H_4$/air vol. ratio of 1/9, and a space velocity of 1200 v/v/hr. The following selectivities and conversions were obtained at various oxidation temperatures.

| Reaction Temperatures °C. | Selectivity % | Conversion % |
|---|---|---|
| 190 | 70 | 26 |
| 200 | 67 | 35 |
| 210 | 64 | 48 |
| 220 | 58 | 82 |

EXAMPLE 5

Silver acetate (L.R. grade recrystallized from distilled water). (5.0 g.) was added to dimethylformamide (50 ml.) containing sodium acetate (0.0121 g.) as promoter. This suspension was added to a 250 ml. round-bottomed flask containing 50 g. of catalyst support (3/16 inch alumina spheres, Hydronyl-Norton Inc.). The procedure followed thenceforth in the preparation and curing of the catalyst was similar to that described in Example 1.

The catalyst was used for the direct air oxidation of ethylene to ethylene oxide using a $C_2H_4$/air ratio of 1/9, and a space velocity of 400 v/v/hr. The following selectivities and conversions were obtained at various oxidation temperatures.

| Reaction Temperature °C. | Selectivity % | Conversion % |
|---|---|---|
| 194 | 73.2 | 13.1 |
| 221 | 67.0 | 22.1 |
| 236 | 66.7 | 33.8 |
| 249 | 66.4 | 42.6 |

In Examples 1–4, the addition of 0.2–2.0 p.p.m. of ethylene dichloride to the gas stream increased selectivities by 2–10% with reduced conversions per pass.

EXAMPLE 6

The procedure of Example 4 was repeated with the use of a mixture of 25 ml each of pyridine and triethylamine in place of triethylamine alone, and gave a catalyst showing similar performance in the oxidation of ethylene to ethylene oxide.

What is claimed is:
1. A method of preparing a supported silver catalyst which comprises the steps of:
   1. impregnating a catalyst support with a solution of silver acetate containing a non-reducing tertiary amine and/or amide,
   2. drying the said impregnated catalyst support whereby silver acetate is retained on the support together with adsorbed said amine and/or amide,
   3. heating the impregnated dried support containing adsorbed amine and/or amide at a temperature of at least 140°C. until a yellow or yellowish-red color is generated on the said support, and
   4. continuing the heating at least until blackening of the support composition is effected.

2. A method according to claim 1 wherein the product obtained is further heated in the presence of an oxygen-containing gas until the support composition has a uniform grey appearance.

3. A method according to claim 1, wherein the said non-reducing tertiary amine is pyridine.

4. A method according to claim 1, wherein the silver acetate is incorporated onto the support together with one or more catalyst promoters.

* * * * *